April 28, 1959   O. H. HANSEN   2,883,720
MEANS AND METHOD FOR FASTENING WOOD MEMBERS TOGETHER
Filed April 25, 1955
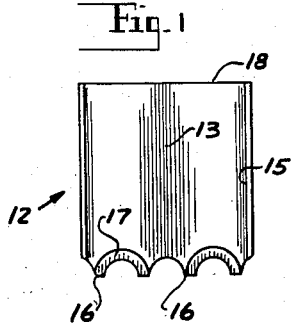
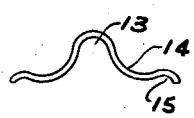
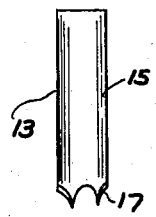
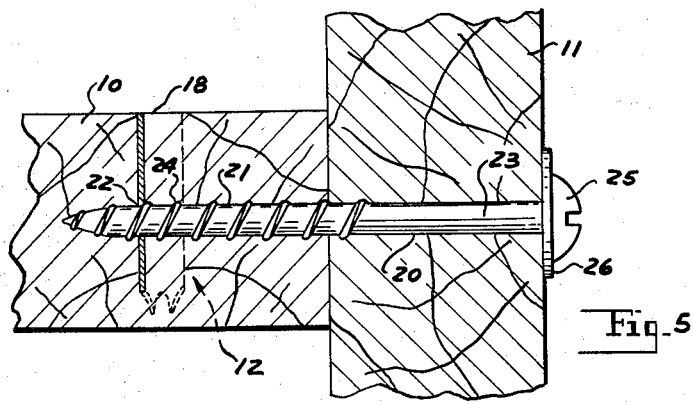
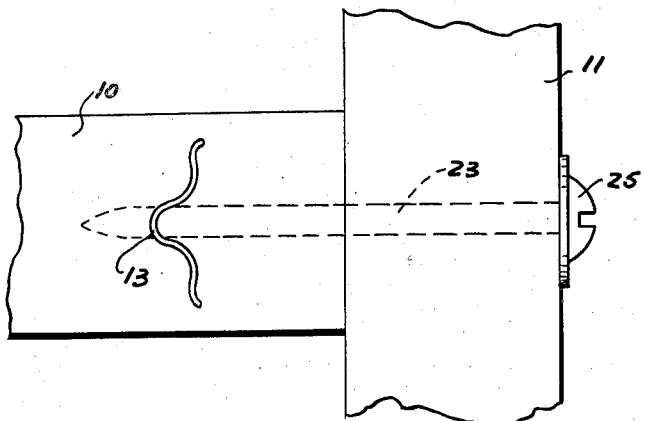
INVENTOR.
OLIVER H. HANSEN
BY Louis Chayka
ATTORNEY.

United States Patent Office 2,883,720
Patented Apr. 28, 1959

2,883,720
MEANS AND METHOD FOR FASTENING WOOD MEMBERS TOGETHER

Oliver H. Hansen, Hazel Park, Mich.

Application April 25, 1955, Serial No. 503,635

2 Claims. (Cl. 20—92)

The improvement pertains to means and a method of joining together such items as component pieces of furniture or other objects, particularly when the objects may be delivered in a dismantled condition so that the parts may have to be assembled and joined in their respective positions.

More specifically, the improvement was designed for use in such objects when they have to be dismantled and again assembled a number of times, and in which the component elements have to be secured in their respective positions by means of screws or threaded bolts.

If the material out of which said parts are made is a substance such as wood, especially soft or brittle wood, the screws, even in cases of a limited consecutive use thereof, would be useless because of the impairment or loss of the threads within the holes made in the members for their reception.

It was to overcome these disadvantages that I have developed the new method to be described herein. It is as a result of this method that members made of soft or brittle material may be firmly held together and that objects composed of such parts may be repeatedly taken apart and re-assembled so that said component parts will retain their respective positions.

Briefly, to illustrate a specific case, the method calls for use of a screw in combination with a metal plate to be driven first into a member to be joined to another member crosswise to the axis of the screw and in the path of its movement in the course of its operative use, the metal plate, at the time of its being driven into said member, being free of any perforations for reception of the screw.

I shall now describe my improvement with reference to the accompanying drawings in which:

Fig. 1 is a plan elevational view of a sheet metal member employed in my method;

Fig. 2 is a top view of the member in its upright position;

Fig. 3 is an end view of the member shown in Fig. 1;

Fig. 4 is an isometric view of said member;

Fig. 5 is a sectional view of two wooden parts of an object connected in accordance with my method;

Fig. 6 is a top elevational view of said parts connected in accordance with my method.

Similar numerals refer to similar parts throughout the several views.

To start with, I first wish to refer to Fig. 5, which shows two members of an object, such as a chair or table, joined together by means of a screw. The members, marked 10 and 11, respectively, are in a T-formation, the member marked 11 being disposed crosswise at the end of the other member, 10.

The present method of fastening the members together would require that both said members 10 and 11 be first drilled so that a bore in member 11, crosswise thereto, would be alined with a bore in member 10 which has the position of the stem in the aforementioned T-formation. Thereupon, with the parts held in said T-formation, a screw would be threaded through the bore in member 11 into the bore in member 10.

In my method, the first step requires that a sheet metal member, at times referred to as a plate, be driven into member 10 crosswise to the axis of the screw to be applied and in the path thereof. The sheet metal member, in its preferred form, is provided with a plurality of undulations or corrugations extending vertically in the direction in which the member is to be driven into said member 10.

A member of this type, generally identified by numeral 12, is bent to include a semi-circular loop 13 blending, at each side, into an arcuate, reversely-turned portion 14 and terminating, at each side, with a shallow end curl 15 bent reversely from the respective arc. The bottom portion of said member 12 is scalloped to define a series of adjoining arcs and to provide a series of sharp points 16 at the junction thereof. The lower edge portion of the member along said arcs is bevelled, as shown at 17, to give said edge a chisel-like quality.

The member may be driven into said member 10 by means of a hammer or some other suitable means till its top 18 is flush with the surface of said member 10. Next, said member 11 has to be brought into abutment with said member 10 crosswise thereto in said T-formation, and, preferably, clamped in said position. Thereupon, a hole 20 is bored in member 11, crosswise thereto, a hole 21 is bored in member 10, and a hole 22 is drilled in said sheet metal member 12, all said holes being made at the same time in one operation. As the thread 24 of the screw extends radially beyond the diameter of the stem of said screw, the threads, in the course of the rotation of the screw, will cut a thread in the rim of the hole 22 in the sheet metal member 12. Once this has been done, a screw engaged within said metal member 12 would keep the parts 10 and 11 together, even if the threads within the bore 21 in member 11 should be partly worn out.

To conclude the above description, I wish to add that numeral 25 identifies the head of the screw 23 and that numeral 26 identifies a washer under the head.

It will be understood that the sheet metal member 12 shown in the drawings illustrates, generally, the type of such members serving to anchor a screw in a relatively soft substance. Obviously, the member may be entirely flat, drawn to a radius, composed of a plurality of integrally-connected portions set in angular relation to each other or generally deflected laterally from a plane, the purpose, in each case, being to provide a member which, driven into a wooden member, would not only prevent its splitting or cracking but would actually make it stronger.

While in the description of the method I have referred to two component members, both of which were made of wood or a comparably soft material, it will be understood that the method is also applicable to cases where only one of the members is made of such a soft material while the other may be made of metal or some other hard substance. In such a case, the sheet metal plate employed in the method would be driven into the soft material.

After having described my improvement, what I wish to claim is as follows:

1. A method of joining two component pieces of relatively soft substance and having abutting plane faces, which comprises the following successive steps: driving an imperforate relatively thin sheet metal plate having a sharpened lower edge into one of said pieces in parallel relation to said abutting faces, with the metal plate being completely and permanently embedded in said piece, supporting said pieces in relatively fixed position with said faces being in contact with each other, drilling a hole through the second of said pieces and into the first of said pieces and also through said metal plate in one operation, and finally threading a screw through the drilled holes including the portion thereof in said metal plate, until the two pieces are firmly drawn together.

2. A method of joining together two component pieces of relatively soft substance having abutting plane faces, which comprises the following successive steps: driving an imperforate corrugated sheet metal plate having a sharpened lower edge into one of said pieces in parallel relation to said abutting faces, with the corrugated metal plate being completely and permanently embedded in said piece, supporting said pieces in relatively fixed position with said faces being in contact with each other, drilling a hole through the second of said pieces and into the first of said pieces and also through said metal plate in right angular relation to the corrugations in said metal plate all in one operation, and finally threading a screw through the drilled holes including the portion thereof in said metal plate, until the two pieces are drawn firmly together.

References Cited in the file of this patent
UNITED STATES PATENTS

| | | |
|---|---|---|
| 525,748 | Starr | Sept. 11, 1894 |
| 977,710 | Craig | Dec. 6, 1910 |
| 1,425,470 | Clardon | Aug. 8, 1922 |
| 1,511,746 | Noll | Oct. 14, 1924 |
| 1,649,903 | Kessler | Nov. 22, 1927 |
| 1,133,204 | Max | Oct. 11, 1938 |
| 2,624,386 | Russell | Jan. 6, 1953 |
| 2,654,923 | Johnson | Oct. 13, 1953 |

OTHER REFERENCES

"Wood Pattern-Making" by Purfield, pages 99 and 100, 6th edition.